(12) United States Patent
Bascin

(10) Patent No.: US 11,963,271 B2
(45) Date of Patent: Apr. 16, 2024

(54) ULTRAVIOLET LAMP OUTPUT MODULATION

(71) Applicant: Trojan Technologies Group ULC, London (CA)

(72) Inventor: David Earl Bascin, London (CA)

(73) Assignee: TROJAN TECHNOLOGIES GROUP ULC, London (CA)

( * ) Notice: Subject to any disclaimer, the term of this patent is extended or adjusted under 35 U.S.C. 154(b) by 255 days.

(21) Appl. No.: 17/621,055

(22) PCT Filed: Sep. 8, 2020

(86) PCT No.: PCT/IB2020/058341
§ 371 (c)(1),
(2) Date: Dec. 20, 2021

(87) PCT Pub. No.: WO2021/048739
PCT Pub. Date: Mar. 18, 2021

(65) Prior Publication Data
US 2022/0338318 A1 Oct. 20, 2022

Related U.S. Application Data

(60) Provisional application No. 62/899,529, filed on Sep. 12, 2019.

(51) Int. Cl.
H05B 41/38 (2006.01)
C02F 1/32 (2023.01)
H05B 47/21 (2020.01)

(52) U.S. Cl.
CPC ............ *H05B 41/38* (2013.01); *C02F 1/325* (2013.01); *H05B 47/22* (2020.01);
(Continued)

(58) Field of Classification Search
CPC ........ H05B 41/38; H05B 47/22; H05B 47/14; C02F 1/325; C02F 2201/3227; C02F 2201/326; C02F 2209/008
(Continued)

(56) References Cited

U.S. PATENT DOCUMENTS 9,119,891 B2 * 9/2015 Livchak .................... A61L 9/20
9,645,009 B2 * 5/2017 Livchak .................. G01J 1/429
(Continued)

FOREIGN PATENT DOCUMENTS

GB 2512708 A 10/2014
GB 2557974 A 7/2018

OTHER PUBLICATIONS

International Search Report for PCT Application, PCT/IB2020/058341, dated Nov. 23, 2020, 3 pages.

*Primary Examiner* — Ryan Jager
(74) *Attorney, Agent, or Firm* — Ference & Associates LLC

(57) ABSTRACT

An embodiment provides method for controlling lamp output within an array of lamps, including: receiving sensor data corresponding to one of a plurality of lamps within the array, wherein the sensor data comprises an irradiance value from at least one of: within a lamp sleeve and an irradiance value from outside a lamp sleeve; identifying, based the sensor data, a change in an output of the one of the plurality of lamps; sharing the sensor data with other of the plurality of lamps within the array; and adjusting, in response to the sharing, an output of at least one of the other of the plurality of lamps within the array, thereby compensating for the change in the output of one of the plurality of lamps. Other aspects are described and claimed.

16 Claims, 3 Drawing Sheets

(52) U.S. Cl.
CPC ..... *C02F 2201/3227* (2013.01); *C02F 2201/326* (2013.01); *C02F 2209/008* (2013.01)

(58) Field of Classification Search
USPC .......................................................... 315/307
See application file for complete search history.

(56) References Cited

U.S. PATENT DOCUMENTS

| | | | | |
|---|---|---|---|---|
| 2003/0218128 | A1* | 11/2003 | Schulz | G01J 1/429 |
| | | | | 250/252.1 |
| 2006/0049360 | A1* | 3/2006 | Schoenlein | G01N 17/004 |
| | | | | 250/372 |
| 2012/0074070 | A1* | 3/2012 | Sichel | C02F 1/32 |
| | | | | 210/85 |
| 2013/0287627 | A1* | 10/2013 | Livchak | B01D 53/007 |
| | | | | 422/3 |
| 2014/0091044 | A1* | 4/2014 | Jhawar | H05B 41/36 |
| | | | | 210/744 |
| 2015/0308890 | A1* | 10/2015 | Livchak | A61L 9/20 |
| | | | | 702/184 |
| 2018/0055960 | A1* | 3/2018 | Reiber | A61L 2/10 |
| 2020/0002192 | A1* | 1/2020 | Labulle | C02F 1/325 |
| 2022/0338318 | A1* | 10/2022 | Bascin | H05B 47/14 |
| 2022/0413166 | A1* | 12/2022 | Saccomanno | A23B 7/015 |

* cited by examiner

ULTRAVIOLET LAMP OUTPUT MODULATION

FIELD

This application relates generally to water quality treatment, and, more particularly, to ultraviolet light treatment of an aqueous fluid.

BACKGROUND

The proper disinfection of water is critical to ensure water quality. As the need for cleaner sources of water has increased, water disinfection methods had evolved to match the rising challenge. Water sources may contain heavy metals, sediment, chemicals, pesticides, or the like. Water sources may also contain pathogens such as microorganisms, viruses, or the like. Left untreated, such water may be unhealthy or unsafe for use by humans or animals. Ultraviolet (UV) light treatment of water may be used to inactivate pathogens. Water may pass through a small chamber or a larger vessel where the water is subjected to UV light. The UV treatment may damage nucleic acids of the pathogens. The disruption of the genetic material may render the pathogens incapable of performing vital cellular functions, thereby rendering them harmless. Thus, this UV process may make water potable despite the water source containing microorganisms, viruses, or the like.

UV treatment may be used in residential, commercial, industrial, agricultural, medical, food processing facilities, or the like. UV treatment may be used for water re-use, soil decontamination, and waste-water treatment applications. UV may also be used to treat contaminants in water, such as trace amounts of pesticides, solvents, or other organic molecules. In this case, the UV wavelengths are used to directly affect chemical bonds of the contaminant, a process called photolysis, or by acting on water itself to create radical species, or by converting an added chemical such as hydrogen peroxide or ozone to a radical species, such as OH radicals, that react with the contaminant to convert it to compounds that are more desirable or less harmful.

BRIEF SUMMARY

In summary, one embodiment provides a method for controlling lamp output within an array of lamps, comprising: receiving sensor data corresponding to one of a plurality of lamps within the array, wherein the sensor data comprises an irradiance value from at least one of: within a lamp sleeve and an irradiance value from outside a lamp sleeve; identifying, based the sensor data, a change in an output of the one of the plurality of lamps; sharing the sensor data with other of the plurality of lamps within the array; and adjusting, in response to the sharing, an output of at least one of the other of the plurality of lamps within the array, thereby compensating for the change in the output of one of the plurality of lamps.

Another embodiment provides an ultraviolet lamp system for controlling lamp output within an array of lamps, comprising: at least one sensor; at least one source of ultraviolet radiation operatively coupled to the at least one sensor; a processor operatively coupled to the at least one source of ultraviolet radiation; and a memory device that stores data and instructions executable by the processor to: receive sensor data corresponding to one of a plurality of lamps within the array, wherein the sensor data comprises an irradiance value from at least one of: within a lamp sleeve and an irradiance value from outside a lamp sleeve; identify, based upon the sensor data, a change in an output of one of the plurality of lamps; share the sensor data with other of the plurality of lamps within the array; and adjust, in response to the sharing, an output of at least one of the plurality of lamps within the array, thereby compensating for the change in the output of one of the plurality of lamps.

A further embodiment provides a product for controlling lamp output within an array of lamps, comprising: a storage device having code stored therewith, the code being executable by the processor and comprising: code that receives sensor data corresponding to one of a plurality of lamps within the array, wherein the sensor data comprises an irradiance value from at least one of: within a lamp sleeve and an irradiance value from outside a lamp sleeve; code that identifies, based upon the sensor data, a change in an output of one of the plurality of lamps; code that shares the sensor data with other of the plurality of lamps within the array; and code that adjusts, in response to the sharing, an output of at least one of the plurality of lamps within the array, thereby compensating for the change in the output of one of the plurality of lamps.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
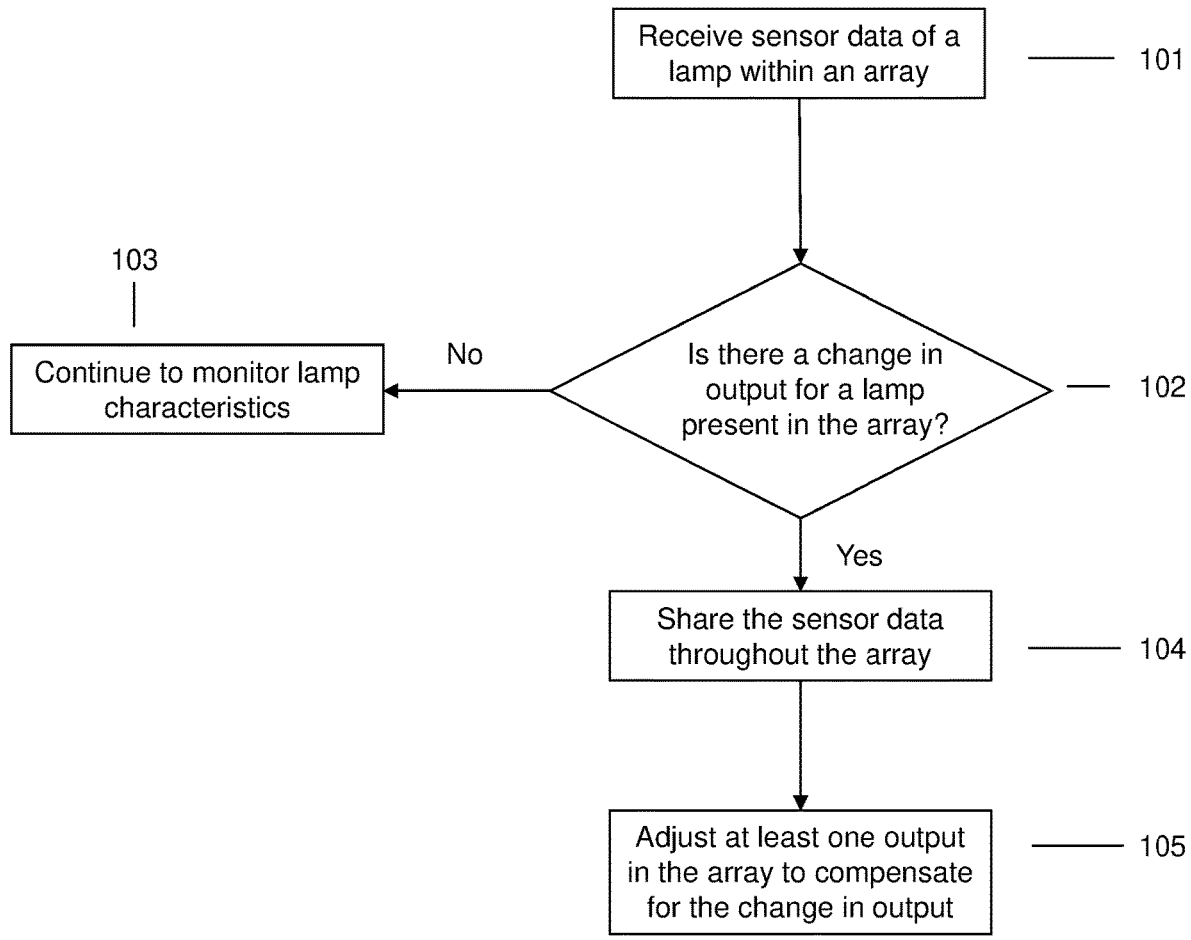
FIG. 1 illustrates a flow diagram of an example lamp sensor modulation of a power supply.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

UV water treatment systems are a cost effective and efficient method to treat water containing biological contaminants. One treatment includes UV disinfection. UV disinfection may protect against water borne viruses, bacteria, molds, or the like. Additionally, UV disinfection may be effective against disease causing organisms such as giardia and cryptosporidium. Proper control of UV light delivered to a volume of water may be essential to the proper treatment of the water. In other words, effective exposure of contaminated water to a UV source may be critical to proper disinfection of a water source. While the majority of this discussion is directed toward UV disinfection, it should be understood that the method and system as described herein extends to any UV treatment, not just disinfection.

UV wavelength may be in the range of 100 to 400 nanometers, which can be provided by a variety of UV light sources, for example, UV light emitting diodes (LEDs), arc lamps, mercury vapor lamps, or the like. Conventional UV light source arrangements vary depending on the application. For example, a residential UV light source may be used to treat well water or other non-municipal water source. Residential units may have a chamber containing a UV light source piped in-line between a water source, such as a well, and the household piping. A residential system may have one or more UV lights that expose the water to UV light as the water passes through the UV purification chamber. Residential systems may be designed for the relatively lower volume of water used by a home as compared to a larger industrial or commercial UV treatment system. Larger UV treatment systems may be found in industrial or commercial facilities such as a municipal water treatment facility. The larger systems may handle large volumes of water, and may, therefore, have a plurality of UV lamps, for example, as arranged in an array. These UV light sources may be arranged in or around vessels of water to be treated with UV light. Commercial systems may have multiple vessels or tubes through which water passes for UV treatment.

For ease of readability, this disclosure focuses mainly, but not solely, on the application of UV treatment of water for the disinfection of drinking water. However, other implementations of the systems and methods described herein are possible and contemplated. For example, since UV light may be used to disinfect surfaces, the described systems and methods may be used in such an application. These surfaces may include areas used to prepare sensitive materials in which organisms or organic residue would contaminate the surface such as a biological hood, surgical suite, food preparation area, clean room, or the like. Additionally, the described system and method may be used for the disinfection of pool water, the disinfection of a gas (e.g., UV light may be used to purify air), contaminated soil, in advanced oxidation or environmental contaminant treatment (ECT) applications, ionization of organic molecules, and the like. Thus, the examples described herein regarding the disinfection of water are merely illustrative. Other uses are contemplated and disclosed.

Conventional UV disinfection systems do have some drawbacks. UV disinfection may rely on the ability of a proper amount of UV light to reach the volume of water to be treated, known as fluence rate. For example, a UV lamp must have the proper output of UV light to be effective. If a UV lamp or lamp sleeve has become worn or begins to fail or malfunction, the water may not be properly treated because the fluence rate is no longer sufficient to perform the disinfection. In other words, a UV lamp or sleeve may degrade over time and, thereby reduce the fluence rate. Also UV lamps and sleeves may be installed in a severe environment, which may also cause or accelerate degradation of the UV lamp or sleeve. For example, due to of the nature of the application, UV lamps and sleeves may be placed very close to or even in a volume of water. Operating and environmental conditions such as temperature, humidity, vibration, UV radiation, or the like, may degrade or damage a UV lamp or sleeve. A degraded UV lamp or sleeve may result in microorganisms remaining viable in the treated water.

To account for these UV lamp and sleeve degradations, conventional systems use a power supply that changes the power output over time, specifically, by increasing the power output in order to increase the power to the UV lamp with the objective of keeping the fluence rate consistent. The UV treatment system power levels are programmed based upon predetermined profiles of UV lamp output as a function of time. In other words, studies are performed on the UV lamps to determine when, for example, as hours of operative life, the UV lamps typically start to degrade. These output profiles are then used to program the UV system power levels, which determine power supply levels, to account for this degradation. Unfortunately, this technique assumes a consistent degradation across all UV lamps, which may not be accurate. Thus, to account for the fact that some UV lamps may degrade faster, the UV treatment system power levels are generally programmed to overdrive the UV lamps. In other words, the power supplies provide "extra" power, thereby causing the UV lamp output to be greater than what is necessary for effective treatment of the water. This overdriving of the UV lamps results in extra electricity expenses, causes the UV lamps to fail quicker, and causes more downtime for replacement of the UV lamps.

Variable losses incurred in power transfer from the power supply to the lamps may also be included when setting power levels. Conventional UV treatment systems incorporating UV lamps may have power distribution to the UV lamps from the power supply including one or more connectors and cables. The power distribution may introduce significant energy losses in the electrical path from power supply to UV lamp. Some conventional UV treatment systems have the power supplies located at various distances from the UV lamps, resulting in an installed distribution power loss to the UV lamps. In the conventional UV systems the power supply output may have a power level setting which is pre-set to compensate for anticipated worst-case power losses in the distribution to the UV lamps. This conservative, but necessary, operational mode results in higher cost for wasted power, early lamp failures, and greater downtime.

Conventional power supplies may monitor electrical characteristics at their output and modulate their operation to reach a desired output power level. To modulate includes, but is not necessarily limited to, controlling any characteristic of the power supply such as current, voltage, power, frequency, and the like. However, this local power measurement cannot determine the power at the UV lamp. Any losses in the power distribution cables and connectors cannot be readily detected by the power supply, leading to non-optimal operation of the UV lamp.

Accordingly, the systems and methods described herein provide a technique for sensor output associated with a lamp to be utilized to adjust characteristics of lamps within an array. In other words, rather than the power supply driving the UV lamps based upon profile curves or predetermined over-drive for installation energy distribution losses, the lamp can measure output power of itself, for example, irradiance values and transmittance values within a plurality of lamps, and use this information to provide commands to adjust outputs of either the lamp itself or other lamps, until it is determined that the proper fluence rate required for disinfection is being achieved, independent of lamp age, lamp variability, connection losses, transmittance changes and the like. The lamp may be an arc lamp, UV LED, or the like. The term "lamp" will be used herein throughout for ease of readability. However, it should be understood by one skilled in the art that the ultraviolet radiation source may include any of the aforementioned devices (e.g., arc lamp, UV LED, etc.) or any other ultraviolet radiation source.

In an embodiment, the system and method may identify at least one underperforming UV lamp assembly of the array. The identifying may be based upon input received from at least one sensor of a UV lamp. A sensor may receive input regarding a lamp with respect to operating conditions, environment, or the like. In an embodiment, the system and method may send, from the UV lamp, a command or control signal, based upon the sensed change (e.g., reduction, increase, etc.) in output, to a processor. In one embodiment the processor may be included within a control module. The control module may include components included on the lamp, on the power supply, and/or independent of either or both the lamp and power supply The command may control one or more characteristics of a power supply, for example modulating the power output of at least one power supply to compensate for a reduction or increase in output of a lamp. Additionally, the command may control one or more characteristics of neighboring lamps within the array, for example, by adjusting the neighboring lamp output to compensate for the change in output of a lamp.

The illustrated example embodiments will be best understood by reference to the figures. The following description is intended only by way of example, and simply illustrates certain example embodiments.

The fluence rate produced by a UV lamp and sleeve may be critical for proper disinfection within a system. For example, a UV lamp and sleeve that is not performing as expected may have low transmittance, and, therefore, may not provide the fluence rate necessary to properly disinfect a source, for example, a water source, gas source, aqueous sample, or the like. Therefore, the described system ensures proper operation of one or more UV lamps to assure that the source is being treated properly. In an embodiment, a UV lamp and sleeve may have an expected value of fluence rate. A UV lamp may be continually monitored to ensure that the fluence rate from the UV lamp array remains constant or at a level that provides proper disinfection.

A UV lamp producing a low fluence rate may cause a system to produce an incomplete treatment of a fluid. The more time a UV lamp is underperforming results in a greater volume of untreated fluid. In an embodiment, all UV lamps in a system may continually monitor their own irradiance value from within the sleeve and the irradiance value of other lamps from outside the sleeves to assist in ensuring that a system is performing at a level that ensures proper disinfection. In an embodiment, a system containing UV lamps may provide information across an array to all other components present in the array, for example, additional UV lamps. When a UV lamp is determined to be providing fluence rate that is lower than an amount needed for proper disinfection, the system may recognize that the UV lamp is underperforming, and may adjust the output power of other UV lamps present in an array to account for the weak output of the underperforming UV lamp. The data relayed to all other components in an array from the struggling UV lamp may include information related to, but not limited to, the irradiance value a UV lamp is currently producing and the location of the UV lamp in an array. In an embodiment, the ability to adjust the output of components to compensate for the lack of output from a single component, e.g., the underperforming UV lamp, may permit a system to perform at a level that ensures proper disinfection of an aqueous source. Such a system reduces wasted power, early lamp failures, and downtime while ensuring proper disinfection. It should be obvious to those skilled in the art that a lamp with higher than the required output can also be compensated for by adjusting the output of components to compensate for that higher output.

Referring now to FIG. 1, an embodiment may adjust the output of at least one lamp within an array of lamps based upon input received from at least one sensor of at least one UV lamp in the array. In an embodiment, sensor data associated with a UV lamp in an array may be received. In receiving the sensor data, the sensor data may identify either or both of the irradiance value from the UV lamp both before and after the UV lamp sleeve. The irradiance value being provided from a UV lamp may identify an irradiance value provided by the UV lamp at the particular location (e.g., before the lamp sleeve, after the lamp sleeve, etc.). In an embodiment, the sensor data provided to a UV lamp may include information describing, identifying, or that could be used to identify, an irradiance value associated with the UV lamp. The irradiance value identifies the value of the radiation that is provided by the lamp. In other words, in layman's terms, the irradiance value is an identification of how much light the lamp is providing or producing. The irradiance value of a UV lamp in an array may be identified, and may be used to identify a change in output of a particular UV lamp in an array. In addition by using the sensor data the transmittance value from one or more lamps may be determined. In other words, in layman's terms, the transmittance value is the gain of the path of radiation from the lamp. In an embodiment, the transmittance and irradiance values of a UV lamp and sleeve may be utilized to adjust another UV lamp present in an array of a plurality of UV lamps. In an embodiment, the transmittance and irradiance values of a UV lamp may be utilized by the same UV lamp, for example, as a form of self-monitoring.

Accordingly, at 101, in an embodiment, sensor data associated with one of a plurality of lamps may be received by the system. Sensor data may include transmittance values, power outputs, electrical characteristics (e.g., voltage, current, etc.), environmental characteristics (e.g., temperature, turbidity of the fluid, etc.), or any other characteristics of the lamp or surrounding environment that may identify a change in output by a lamp. The lamp may be included in an array of lamps that are utilized to disinfect a water source. Each of the UV lamps may be an assembly. UV lamp assemblies may include one or more light sensors that produce and recognize signal measurements. For example, the UV lamp assembly may include a light sensor that can measure a value of irradiance produced by the lamp. The light sensors may be of different wavelengths than the wavelength of the treatment lamp. For example, the light sensors may be of any wavelength from visible to infrared sensors, whereas the wavelength of the treatment lamp is within the ultraviolet (UV) wavelength. Additionally, the light sensor wavelengths may be UV sensors.

The UV lamp assembly may include more than one light sensor, with each light sensor measuring an output of the lamp at a different location, for example, before a lamp sleeve and after a lamp sleeve. The lamp assembly may also include more than one lamp sensor that measures an output at the same location, for example, two lamp sensors before a lamp sleeve. This redundancy may assist in ensuring that a reading received from a sensor is accurate. For example, if the sensor readings do not match, the system may alert a user that one of the sensors may have failed.

Thus, in an embodiment, the sensor data may identify UV lamp output before a lamp sleeve and after a lamp sleeve. Acquiring sensor data at two points, before and after the lamp sleeve, may assist a system in determining what issue may be causing an underperforming UV lamp. For example, if the sensor data identifies that the UV lamp output before the lamp sleeve is as expected, but the UV lamp output after the lamp sleeve is less than expected, the system may identify that a possible issue exists with the lamp sleeve. In an embodiment, the sensor data associated with a UV lamp may be continually monitored by the UV lamp itself, as well as a processor, or overall system. Not only may the collection of data be used in real-time, but this collection of data may also be stored and used over time to predict future issues with a UV lamp assembly. In other words, the system may use a machine-learning algorithm to associate sensor data signatures with possible faults or imminent faults.

Additionally, in an embodiment, the sensor data provided by a UV lamp may include location data that identifies the location of the lamp in an array. Identification of the location of the lamp may assist in identifying neighboring lamps. As discussed in further detail below, the neighboring lamps may be adjusted to account for a lamp that is underperforming. Thus, identifying the location of the lamp within the assembly assists in identifying which other lamps should be adjusted to account for the deficiencies of the underperforming lamp.

At 102, a system may determine if a change in the output of a UV lamp is present in an array. A change in the output may be either an increase or decrease in output. For example, over time the UV lamp and/or sleeve may degrade which may reduce the output of the lamp. Conversely, when a UV lamp and/or sleeve is replaced or cleaned, the output of the lamp may increase. The system may utilize the sensor data to identify a possible change in output of a lamp within the array. For example, the system may have default values for any of the characteristics that can be measured or identified from any of the sensors provided within the system. When the system receives information from the sensor, the system may compare that information to the default values. If the difference between the received information and the default values is above a predetermined threshold, the system may identify that as a change in output. As another example, the system may compare sensor information between different sensors in the system. Differences in sensor information among a group of sensors may indicate a change in output of one or more lamps. For example, the system may determine that differences in sensor information between neighboring or adjacent lamps above a predetermined threshold may indicate a change in power of one or more of the lamps. Thus, a lamp that is underperforming or providing a lowered output may result in sensor data identifying as much. Similarly, a lamp that is providing an output greater than a previous output may result in sensor data identifying as much.

A reduction in output may be due to one or more of a variety of issues that may occur within a UV lamp assembly. For example, a reduction in the output of lamp may be a result of an issue with a lamp sleeve. Lamp sleeves may become dirty or fouled, thereby reducing the output of the lamp. As another example, the reduction in the output of the lamp may be due to the degradation of the lamp itself. As another example, the reduction in the output of the lamp may be caused by loose wiring, removed connections, or the like. Accordingly, the ability to receive multiple sensor outputs, signals, or measurements in different locations may assist in determining the cause of the change in output. For example, if a sensor reading before a lamp sleeve indicates the UV lamp is providing an expected output, but a sensor reading after a lamp sleeve indicates the UV lamp is providing an output lower than expected, the cause may be attributable to an issue with the lamp sleeve. By identifying a probable cause of the change in output, the amount of downtime necessary for having to address the issue is reduced.

In an embodiment, identifying a possible change in output may be performed based upon irradiance data. The irradiance data may include irradiance data of a single UV lamp, which may include multiple irradiance sensors, an array of UV lamps, which may also include multiple irradiance sensors, or other sensors which may provide information from which the irradiance values can be determined. Additionally, an embodiment may utilize the irradiance sensor and the irradiance data collected in conjunction with additional sensor data to determine if there is a change in output in an array. For example, a change may be identified by identifying the ultraviolet irradiance value of a particular UV lamp and comparing it against irradiance values of other UV lamps present in the array. Each of the UV lamps that are used for comparison may be located at different distances from the original UV lamp.

By using lamps at different distances, the system may be able to determine the exact lamp that has the change in output and may also be able to determine the cause of the change. Additionally, by using more than one comparison UV lamp, the system can identify which of the lamps has the change in output. For example, if only a target lamp were compared against one other lamp and both have different readings, it may be difficult to determine if the one with the lower reading has a change in output, or if the one with the higher reading is malfunctioning. Thus, if at least two of the UV lamps have similar readings, then it is easier to determine if a lamp is experiencing a change in output and which lamp is not performing as expected.

In an embodiment, when a change in output is not present, a system may continue to regularly monitor a system for changes at 103. In the case that a change in the output of a UV lamp is present, the system may share this information with other components present in the array at 104. For example, if a UV lamp that has a change in output is present in an array containing five additional UV lamps, data related to the change of output of the original UV lamp may be shared with the five other UV lamps in the array. As another example, the change in output information may be shared with a central controller or processor. The different components of the system may utilize the information to compensate for the change in output, as discussed further herein. A system may also share the information in order to pinpoint where a change in output is occurring, how much of a change in output is occurring, and the like. In an embodiment, all lamps in an array may communicate via a multicast arbitration method, meaning that any lamp in the array can request data pertaining to another lamp.

After some or all components in the array receive data regarding a change in output at a UV lamp, a system may adjust at least one characteristic of the array to compensate for the change in output at 105. Specifically, when one of the UV lamps is experiencing a change in output, output of at least one other UV lamp output in the array may be adjusted. Adjusting the output of other UV lamps may include adjusting the output of UV lamps neighboring the change output lamp or target lamp. The output of these lamps may be increased or decreased, depending on the change experienced, in order to maintain a desired fluence rate within the fluid area that is serviced by the target UV lamp and the neighboring lamps. Since the lamps do not have an unlimited amount by which the output can be changed, the output of multiple neighboring UV lamps may be changed to compensate for the change in output of the target lamp. Adjusting the output of the UV lamps may include adjusting the output of non-neighboring UV lamps. For example, the output of lamps that are upstream or downstream of the target lamp may be adjusted. Thus, since the target lamp is not producing enough output to properly disinfect the fluid or is producing more output than needed to properly disinfect the fluid, the upstream or downstream lamps can be adjusted to compensate for the decrease/increase in disinfection by the target lamp.

In an embodiment, a system may utilize the multi-cast method with arbitration to change a single or multiple UV lamp power levels in an array. Additionally, the method may be used to sample and report individual sensor readings from the adjusted lamps. An embodiment may include encoded timing references for the time at which to sample and modulate light within the data transmission or may also include additional synchronization communication on separate electrical signal lines between the components present in an array. In an embodiment, the lamps may be pre-programmed or furnished with location and lamp spacing data. In an embodiment, the lamps may be pre-programmed with array information via data communications over the same or another physical communication bus.

In an embodiment, a table of sensor readings may be built up over time describing the multiple paths of light present in a UV lamp array. The UV lamps may use the multiple paths of light that are affected by each UV lamp to control other UV lamps output, including turning the lamps on and off, dimming the lamps, and the like. Additionally, the lamps may control their own output. The lamps and associated sensors may sample light from different directions, paths, and distances through the treatment system in order to identify changes in output. Additionally, since all lamps having access to all other lamps measurements and location data, the system can determine a lamp having a change in output and a possible root cause of the change in output. In an embodiment, using a predetermined model of the UV light transmission through the given system over various paths of ultraviolet transmittance of the light path, treated fluid, lamps and sleeves, along with the irradiance of individual lamps from within and outside the sleeves, changes in output and causes may be determined.

Figure 2:
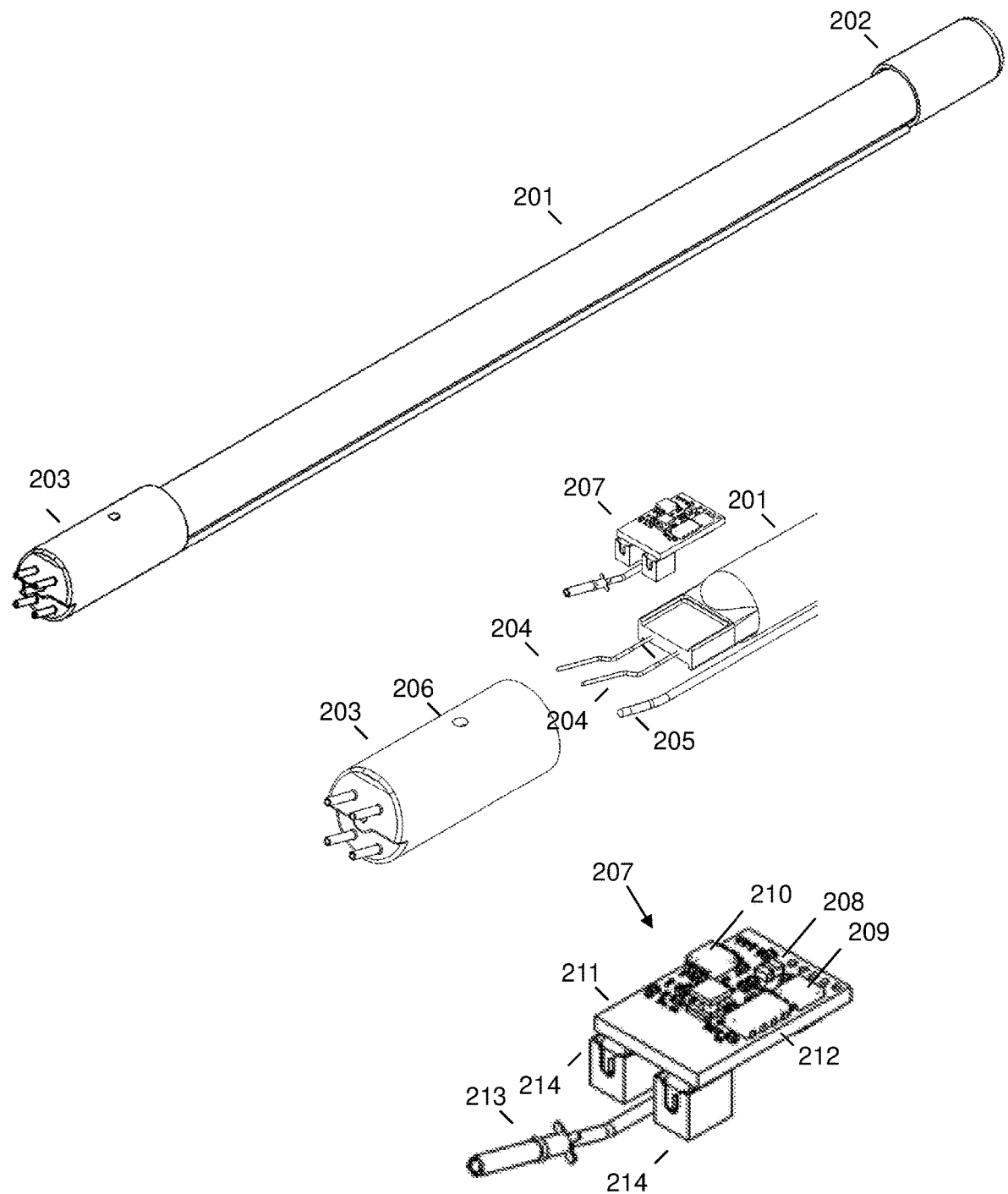
FIG. 2 illustrates an example lamp with sensors that modulate a power supply.

Referring to FIG. 2, an example embodiment of a lamp assembly is shown. While in this example embodiment a gas discharge lamp with filaments at each end of the lamp is used it should be obvious to those skilled in the art that the assembly combining the lamp, sensor or sensors, and circuit assembly or circuit assemblies may be used in an application with any type of UV light source whether a gas discharge lamp, UV LED, or any other type of UV light source, and such assembly could be implemented using a single such UV light source or of any type or combination of types of one or more UV light sources in an array or cluster. The example embodiment in FIG. 2 includes a UV lamp 201, lamp base with pins 203, and lamp base 202. This assembly includes a sensor opening 206 in the lamp base 203 and the circuit assembly 207 which, when fully assembled, is covered by the lamp base with pins 203.

The sensor opening 206 may be used to expose sensors associated with the UV lamp 201 to the UV lamp and the environment surrounding the lamp. In this example embodiment the circuit assembly 207 is constructed by soldering components on a printed circuit substrate 211 and includes a microcontroller unit 210, UV sensor 208, humidity sensor 209, and accelerometer 212. Those skilled in the art will understand that any sensors of the environment and the UV lamp 201 for electrical, optical, or physical conditions can be integrated into the assembly.

The circuit assembly 207 in this embodiment includes a data pin 213 which when fully assembled is inserted into the lamp base with pins 203. The circuit assembly 207 has in this case two terminals 214 which when fully assembled the filament wires 204 are pressed into the terminals 214. Thus, in this embodiment, the circuit assembly 207 has access to electrically sense the electrical signal on the filament wires 204 and at the same time use one or both of the filament wires 204 along with the data pin 213 to be powered by and communicate commands to any combination of an external control module or external power supply that powers the lamp. In this example embodiment, the lamp base with pins 203 has the filament wires 204 attached to the pins along with the long filament wires 205. The long filament wires 205 connect only to the pins in the lamp base with pins 203. Those skilled in the art will understand that the circuit assembly 207 could be provided with access to the long filament wires 205.

It should be clear to those versed in the art that a wired communication and lamp power interface such as this embodiment could have one or more external control modules and/or processors connected to it along with the power supply that powers the lamp. It should further be obvious that the circuit assembly 207 could be powered by the external control module or modules and/or processor(s), the external power supply that powers the lamp, or any combination thereof. As an example the external control module could power the circuit assembly 207 and be commanded by the circuit assembly 207 to modulate lamp outputs. In another example this embodiment could be connected to an external power supply that powers this lamp 201 and is capable of being modulated directly by commands sent from the circuit assembly 207 via the data pin 213 and one or more of the filament wires 204 or 205.

The command produced by the lamp and sent to the control module, processor, and/or power supply from the lamp may then be used to modulate a power supply for lamp 201 and/or other lamps within the array. In other words, the lamp may provide a command which is then sent to the processor, control module, or directly to the power supply, to modulate the power supply, resulting in a corrective action responsive to the input received from at least one sensor associated with at least one lamp. For example, the control module may forward the command received from the lamp to the power supply, the control module may process the command and then send an output to the power supply based upon the processed command, or the like. For example, a sensor may collect information on the numbers of hours a lamp has been turned on. The system may have a predetermined threshold for number of hours of service life a lamp may have. If a lamp is nearing the end of a service life, then the lamp may determine the lamp is nearing an hour limit, and send a command to the processor or power supply to turn off, reduce power, or the like, to the lamp nearing the hour limit. Additionally or alternatively, the system may send a command to a processor or power supply of a lamp that has a decrease in UV light output commanding it to increase power to the lamp. Hour usage is an illustrative example, and other sensors with other associated lamp characteristics are disclosed.

In an embodiment, the modulation of a power supply may bring a lamp back to a desired functioning parameter. The lamp is able to provide instructions to the power supply so that the lamp can achieve maximum useful lifespan. Modulation of the power supply may include modulating power output, modulating current output, modulating voltage output, modulating power supply cycles or cycle times, output pulse width or duty cycle, or modulating any other characteristic of the power supply.

In an embodiment, there may be communication between a plurality of sensors, lamps, control modules, processors, and power supplies. For example, if at least one sensor associated with a lamp indicates that that the lamp is outside of a desired characteristic, one or more systems associated with another lamp or plurality of lamps may receive a command to compensate for the loss of function of the lamp. In other words, UV treatment systems may be designed with redundancy using more lamps or multiple systems that may compensate for a failure or reduced performance of one or more lamps. In this manner input from a sensor of a lamp outside normal characteristics may lead to modulation of a power supply for properly functioning lamps. The communication between the components may be at the processor, control module, or power supply level.

The system may connect to a communication network. The system may alert a user or a network. This alert may occur whether a power supply modulation occurs or not. An alert may be in a form of audio, visual, data, storing the data to a memory device, sending the output through a connected or wireless system, printing the output or the like. The system may log information such as a sensor output value, location, a corrective action, time, date, number of cycles, or the like. The alert or log may be automated, meaning the system may automatically output whether a correction was required or not. The system may also have associated alarms, limits, or predetermined thresholds. Alarms or logs may be analyzed in real-time, stored for later use, or any combination thereof.

Figure 3:
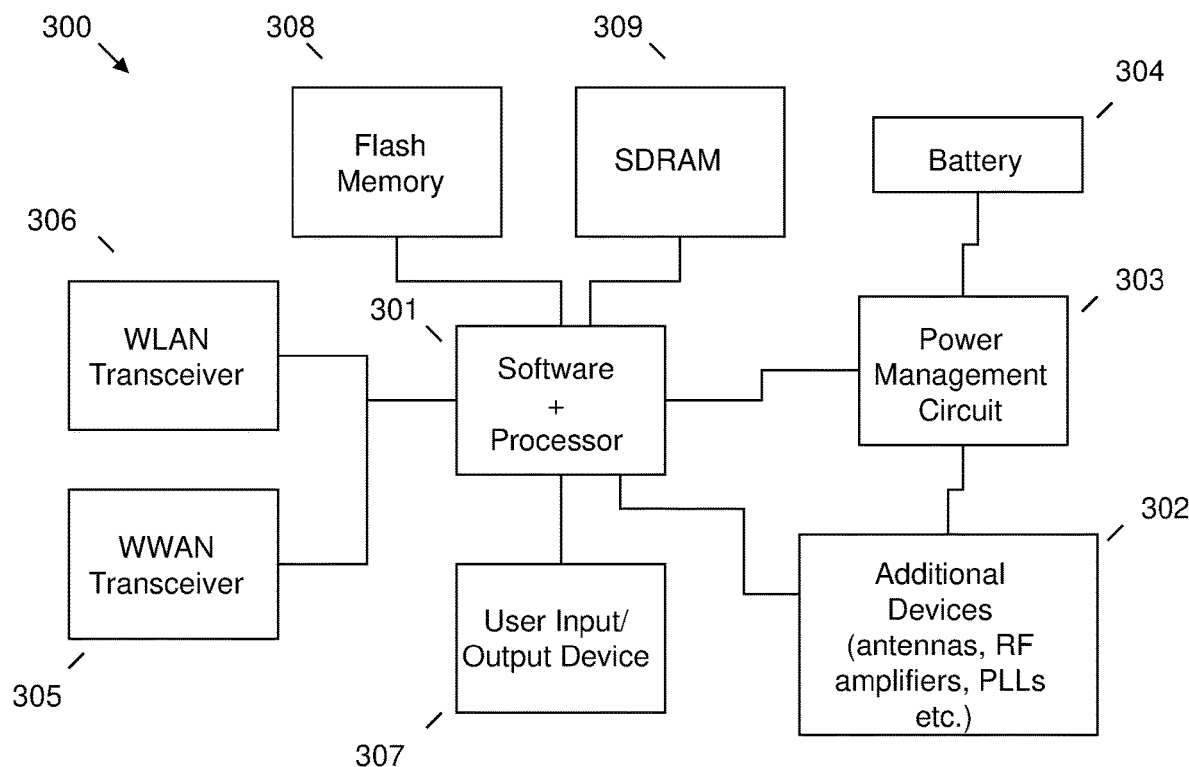
FIG. 3 illustrates an example of computer circuitry.

While various other circuits, circuitry or components may be utilized in information handling devices, with regard to an instrument for water treatment according to any one of the various embodiments described herein, an example is illustrated in FIG. 3. Device circuitry 300 may include a measurement system on a chip design found, for example, a particular computing platform (e.g., mobile computing, desktop computing, etc.) Software and processor(s) are combined in a single chip 301. Processors comprise internal arithmetic units, registers, cache memory, busses, I/O ports, etc., as is well known in the art. Internal busses and the like depend on different devices that vary by chip manufacturer, but essentially all the peripheral devices (302) may attach to a single chip 301. The circuitry 300 combines the processor, memory control, and I/O controller hub all into a single chip 301. Also, systems 300 of this type do not typically use SATA or PCI or LPC. Common interfaces, for example, include SDIO and I2C.

There are power management chip(s) 303, e.g., a battery management unit, BMU, which manage power as supplied, for example, via a rechargeable battery 304, which may be recharged by a connection to a power source (not shown). In at least one design, a single chip, such as 301, is used to supply BIOS like functionality and DRAM memory.

System 300 typically includes one or more of a WWAN transceiver 305 and a WLAN transceiver 306 for connecting to various networks, such as telecommunications networks and wireless Internet devices, e.g., access points. Additionally, devices 302 are commonly included, e.g., a transmit and receive antenna, oscillators, RF amplifiers, PLLs, etc. System 300 includes input/output devices 307 for data input and display/rendering (e.g., a computing location located remotely from the lamp or lamp array). System 300 also typically includes various memory devices, for example flash memory 308 and SDRAM 309.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a serial connection such as USB or RS485 connections.

Example embodiments are described herein with reference to the figures, which illustrate example methods, devices and products according to various example embodiments. It will be understood that the actions and functionality may be implemented at least in part by program instructions. These program instructions may be provided to a processor of a device or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be effected therein by one skilled in the art without departing from the scope or spirit of the disclosure.

The invention claimed is:

1. A method for controlling lamp output within an array of lamps, comprising:
   receiving sensor data corresponding to one of a plurality of lamps within the array, wherein the sensor data comprises an irradiance value from at least one of: within a lamp sleeve and an irradiance value from outside a lamp sleeve;
   identifying, based the sensor data, a change in an output of the one of the plurality of lamps;
   identifying a cause of the change in the output of the one of the plurality of lamps, wherein the cause is selected from the group consisting of: issue with a lamp sleeve, issue with a fluid surrounding the one of the plurality of lamps, and issue with the one of the plurality of lamps, wherein the identifying a cause comprises comparing the lamp output within the lamp sleeve to the lamp output outside the lamp sleeve;
   sharing the sensor data with other of the plurality of lamps within the array; and
   adjusting, in response to the sharing, an output of at least one of the other of the plurality of lamps within the array, thereby compensating for the change in the output of one of the plurality of lamps.

2. The method of claim 1, further comprising receiving additional sensor data for other of the plurality of lamps within the array, wherein the additional sensor data comprises a lamp irradiance value from at least one of: within a lamp sleeve and an irradiance value from outside a lamp sleeve, for the corresponding lamp within the array.

3. The method of claim 1, wherein the identified cause comprises an issue with a lamp sleeve; and
   further comprising providing an output to clean or replace the lamp sleeve.

4. The method of claim 1, wherein the adjusting comprises changing the output of the at least one of the other of the plurality of lamps.

5. The method of claim 1, wherein the identifying a change in the output comprises comparing the sensor value to irradiance data received from a dedicated irradiance sensor within the array.

6. The method of claim 1, wherein the sensor data further comprises location data identifying a location of the one of the plurality of lamps with the array.

7. The method of claim 1, wherein the plurality of lamps within the array communicate via a multi-cast with arbitration method, wherein the adjusting comprises sending a request to adjust the output to the at least one of the other of the plurality of lamps via the multi-cast method.

8. The method of claim 1, wherein the identifying a change comprises determining an ultraviolet transmittance value of the path from one of a plurality of lamps within the array by comparison of irradiance data from at least two of the plurality of lamps within the array, each being located at separate distances from the one of a plurality of lamps within the array.

9. An ultraviolet lamp system for controlling lamp output within an array of lamps, comprising:
   at least one sensor;
   at least one source of ultraviolet radiation operatively coupled to the at least one sensor;
   a processor operatively coupled to the at least one source of ultraviolet radiation; and
   a memory device that stores data and instructions executable by the processor to:
   receive sensor data corresponding to one of a plurality of lamps within the array, wherein the sensor data comprises an irradiance value from at least one of: within a lamp sleeve and an irradiance value from outside a lamp sleeve;
   identify, based upon the sensor data, a change in an output of one of the plurality of lamps;
   identify a cause of the change in the output of the one of the plurality of lamps, wherein the cause is selected from the group consisting of: issue with a lamp sleeve, issue with a fluid surrounding the one of the plurality of lamps, and issue with the one of the plurality of lamps, wherein the identifying a cause comprises comparing the lamp output within the lamp sleeve to the lamp output outside the lamp sleeve;
   share the sensor data with other of the plurality of lamps within the array; and
   adjust, in response to the sharing, an output of at least one of the plurality of lamps within the array, thereby compensating for the change in the output of one of the plurality of lamps.

10. The device of claim 9, further comprising receiving additional sensor data for other of the plurality of lamps within the array, wherein the additional sensor data comprises a lamp irradiance value from at least one of: within a lamp sleeve and an irradiance value from outside a lamp sleeve, for the corresponding lamp within the array.

11. The device of claim 9, wherein the identified cause comprises an issue with a lamp sleeve; and
   further comprising providing an output to clean or replace the lamp sleeve.

12. The device of claim 9, wherein the adjusting comprises changing the output of the at least one of the other of the plurality of lamps.

13. The device of claim 9, wherein the identifying a change in the output comprises comparing the sensor value to irradiance data received from a dedicated irradiance sensor within the array.

14. The device of claim 9, wherein the sensor data further comprises location data identifying a location of the one of the plurality of lamps with the array.

15. The device of claim 9, wherein the plurality of lamps within the array communicate via a multi-cast with arbitration method, wherein the adjusting comprises sending a request to adjust the output to the at least one of the other of the plurality of lamps via the multi-cast method.

16. A product for controlling lamp output within an array of lamps, comprising:
   a storage device having code stored therewith, the code being executable by the processor and comprising:
   code that receives sensor data corresponding to one of a plurality of lamps within the array, wherein the sensor data comprises an irradiance value from at least one of: within a lamp sleeve and an irradiance value from outside a lamp sleeve;
   code that identifies, based upon the sensor data, a change in an output of one of the plurality of lamps;
   code that identifies a cause of the change in the output of the one of the plurality of lamps, wherein the cause is selected from the group consisting of: issue with a lamp sleeve, issue with a fluid surrounding the one of the plurality of lamps, and issue with the one of the plurality of lamps, wherein the identifying a cause comprises comparing the lamp output within the lamp sleeve to the lamp output outside the lamp sleeve;
   code that shares the sensor data with other of the plurality of lamps within the array; and
   code that adjusts, in response to the sharing, an output of at least one of the plurality of lamps within the array, thereby compensating for the change in the output of one of the plurality of lamps.

\* \* \* \* \*